United States Patent
Wainright (10) Patent No.: US 11,732,796 B1
(45) Date of Patent: Aug. 22, 2023

(54) DOUBLE BAFFLE DIFFERENTIAL LUBRICATION STRATEGY

(71) Applicant: Rivian IP Holdings, LLC, Irvine, CA (US)

(72) Inventor: Jaymes Wainright, Livonia, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/842,378

(22) Filed: Jun. 16, 2022

(51) Int. Cl.
*F16H 57/04* (2010.01)

(52) U.S. Cl.
CPC ....... *F16H 57/0483* (2013.01); *F16H 57/043* (2013.01); *F16H 57/046* (2013.01); *F16H 57/0409* (2013.01); *F16H 57/0427* (2013.01)

(58) Field of Classification Search
CPC ............. F16H 57/0483; F16H 57/0409; F16H 57/0427; F16H 57/043; F16H 57/046
USPC ......................................................... 475/160
See application file for complete search history.

(56) References Cited

U.S. PATENT DOCUMENTS

| | | | | |
|---|---|---|---|---|
| 2,018,847 A | * | 10/1935 | Fraser ....................... | B24B 1/00 451/146 |
| 3,251,558 A | * | 5/1966 | Palyi ......................... | B02C 7/00 241/74 |
| 5,743,519 A | * | 4/1998 | Chang ....................... | B65H 3/68 271/267 |
| 6,038,840 A | * | 3/2000 | Ishimori ................. | A01D 34/66 56/13.3 |

* cited by examiner

*Primary Examiner* — Colby M Hansen
(74) *Attorney, Agent, or Firm* — Haley Guiliano LLP (57) ABSTRACT

Systems and methods are presented herein for lubricating a differential assembly using a double baffle assembly. The differential assembly comprises a lubrication jet, an output gear, and the double baffle assembly. The output gear comprises openings and the lubrication jet is aligned with the openings in the output gear. The double baffle assembly comprises an inner baffle and an outer baffle that collectively form a slot aligned with the openings in the output gear. The inner baffle is configured to guide lubrication expelled from the lubrication jet towards the openings in the output gear, regardless of whether the differential assembly is in an engaged state or disengaged state.

20 Claims, 7 Drawing Sheets

DOUBLE BAFFLE DIFFERENTIAL LUBRICATION STRATEGY

INTRODUCTION

The present disclosure is directed to systems and methods for lubricating a differential, and more particularly, to systems and methods that actively lubricate a differential assembly in connected and disconnected states.

SUMMARY

A differential assembly uses lubrication to reduce wear on the various components interfacing within the differential assembly. For example, a differential assembly may comprise an output gear which interface with a pair of opposing axle shafts connected to wheel assemblies in a vehicle. The output gear may be actuated by a drive pinion connected to a drive shaft which received rotational inputs from a vehicle powertrain. The interface between the drive pinion and the output gear may be subjected to substantial loads and the interface may lead to component deformation and wear if an appropriate amount of lubrication is not present to enable consistent and smooth operation of the differential assembly.

The present disclosure is directed to a lubrication strategy for a differential, and more particularly, to a baffle arranged on a surface of an output gear of a differential configured to direct lubrication towards the internal interfaces of the differential. The baffle enables internals of the differential to remain lubricated without dependence on an oil level in the sump in which internal components are dipped during articulation of the differential internal components. Additionally, the baffle enables lubrication of the internals of the differential during both connected and disconnected states. As a result, efficiency and reliability of the differential assembly is maximized for the life of the components. In some embodiments, the baffle comprises an assembly with a first inner baffle and a second outer baffle. The profile of the inner baffle is configured to guide the flow of lubrication expelled towards the output gear into openings in the output gear. In some embodiments, the lubrication is introduced by a lubrication jet.

The surface between the two baffles further comprises a plurality of slots spaced to align with openings in the output gear such that as the output gear rotates, the lubrication can enter the differential assembly through the opening in the output gear after being guided into the opening by the slots between the two baffle edges. This eliminates a need to aim the lubrication jet at a particular window in the disconnected state of the differential. In some embodiments, the first baffle is arranged towards an outer radius of the opening in the output gear and the second baffle is arranged towards an inner radius of the opening in the output gear. The first baffle is configured to catch deflected lubrication that has a trajectory towards the outer radius of the differential housing (e.g., as caused by rotational motion of the output gear and any splashing of the oil jet) and the second baffle is configured to collect other lubrication (e.g., when the gear is at rest and any splashing of the oil jet) such that it is diverted through the openings in the output gear. In some embodiments, the baffle may be formed by injection molding. In other embodiments, the baffle may be formed by pressing metal to form the two edges and the surface of the baffle. The baffle may be secured to the output gear by a plurality of fasteners (e.g., screws, pins, and/or adhesive coated features configured to interface with complementing features on the output gear). In some embodiments, the baffle reduces the overall volume of the lubrication sump, thereby providing a weight savings.

In some embodiments, the output gear of the differential comprises an opening in an outer surface and a double baffle assembly affixed to the outer surface. The double baffle assembly comprises an inner baffle arranged radially inward of the opening and an outer baffle arranged radially outward of the opening, wherein the inner baffle and outer baffle are configured to guide fluid to the opening. In some embodiments, the inner baffle comprises a protrusion configured to direct lubrication towards the opening. In some embodiments, the double baffle assembly comprises a connecting extension between the inner baffle and the outer baffle. In some embodiments, the double baffle assembly comprises a plurality of slots radially aligned with the opening.

In some embodiments, the double baffle assembly is fixedly attached to the outer surface of the output gear or differential housing by fasteners. Alternatively, or additionally, the double baffle assembly is fixedly attached to the outer surface of the output gear or differential housing by at least one of an adhesive and a feature configured to be received by the outer surface of the output gear or differential housing. The double baffle assembly may comprise a plurality of spaced ribs that extend radially from an inner diameter of the double baffle assembly towards an outer diameter of the double baffle assembly. In some embodiments, the double baffle assembly comprises a plurality of tabs configured to receive fasteners to affix the double baffle assembly to the outer surface of the output gear or differential housing.

In some embodiments, the disclosure is directed to an assembly comprising an output gear having an inner surface and an outer surface and an opening therebetween. Additionally, a differential is arranged to interface with the inner surface of the output gear, and a baffle assembly is affixed to the outer surface, wherein the baffle assembly comprises a slot radially aligned with the opening. In some embodiments, the baffle assembly further comprises a radially inner baffle affixed to the outer surface of the output gear or differential housing and arranged along a radially inner edge of the opening, and a radially outer baffle affixed to the outer surface of the output gear or differential housing and arranged along a radially outer edge of the opening.

In some embodiments, the baffle assembly comprises a surface between the inner baffle and the outer baffle aligned with a trajectory of a lubrication jet. The lubrication jet is arranged to spray lubrication towards the opening. The baffle assembly may also comprise a radially inner baffle affixed to the outer surface of the output gear or differential housing and arranged along a radially inner edge of the opening, and a radially outer baffle affixed to the outer surface of the output gear or differential housing and arranged along a radially outer edge of the opening. Additionally, or alternatively, the baffle assembly may comprise a plurality of slots radially aligned with the opening.

In some embodiments, the baffle assembly is fixedly attached to the outer surface of the output gear or differential housing by fasteners. In some embodiments, the baffle assembly is fixedly attached to the outer surface of the output gear or differential housing by at least one of an adhesive and a feature configured to be received by the outer surface of the output gear or differential housing. Additionally, or alternatively, the baffle assembly comprises a plurality of evenly spaced ribs that extend radially from a center of the baffle assembly towards an outer perimeter. In some embodiments, the baffle assembly comprises a plurality of tabs configured to received fasteners to affix the baffle assembly to the outer surface of the output gear or differential housing.

In some embodiments, the output gear may also be configured to change between a connected and disconnected state while maintaining alignment of the slot and the opening for continuous lubrication of the differential.

In some embodiments, the disclosure is directed to a method of lubricating a differential. A lubrication jet expels lubrication towards an output gear of the differential assembly. The lubrication is guided through the opening in the output gear towards an opening in the output gear via a first baffle extension and a second baffle extension arranged towards a radially inner edge of the opening and a radially outer edge of the opening, respectively. In some embodiments, the lubrication is collected in a sump or reservoir and the output gear is arranged such that at least one edge of the output gear is submersed below the surface of the lubrication in the sump or reservoir.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for lubricating internal interfaces of a differential assembly, and more particularly, to systems and methods that utilize a pair of baffles to guide lubrication into differential assembly through an output gear while the differential assembly is in either a connected or disconnected state.

Figure 1:
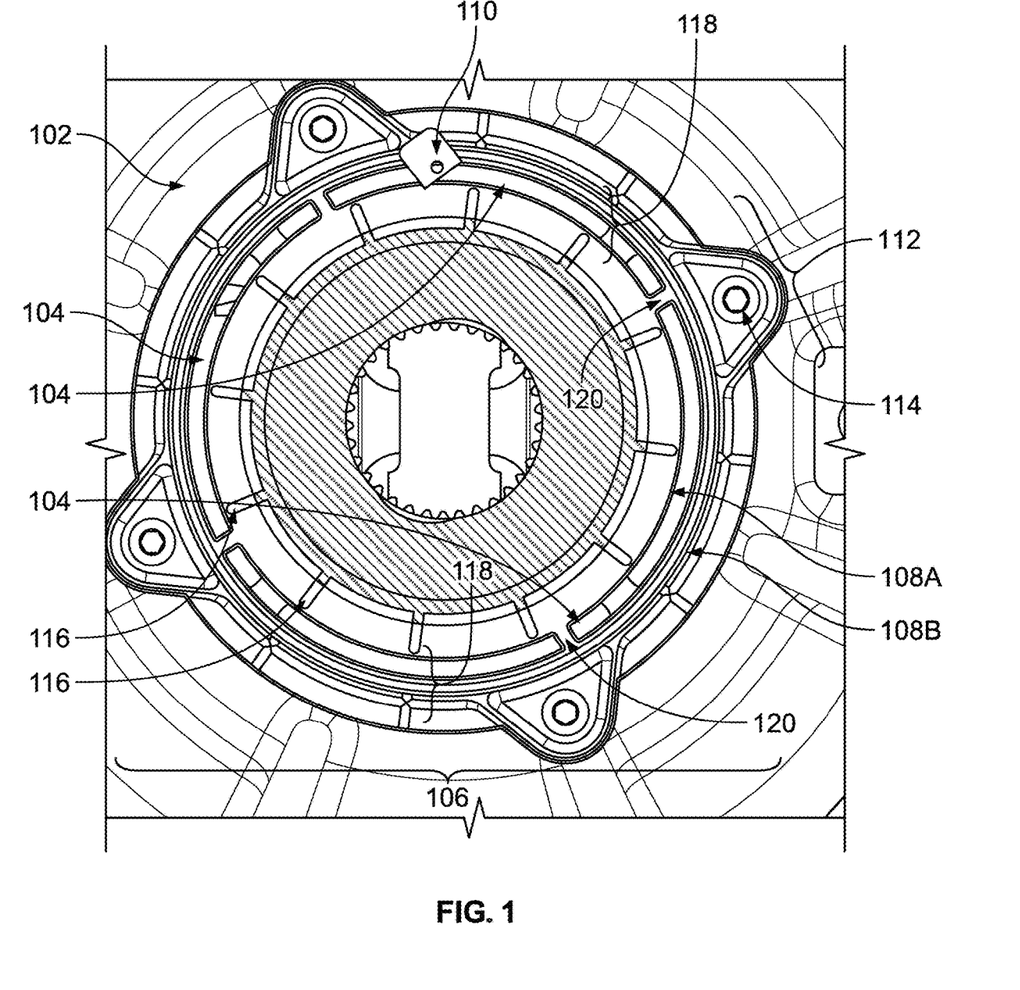
FIG. 1 is an illustrative example of a double baffle assembly affixed to an output gear, in accordance with some embodiments of the disclosure.

FIG. 1 depicts double baffle assembly 106 affixed to output gear outer surface 102, in accordance with some embodiments of the disclosure. Double baffle assembly 106 may comprise fewer, or additional, features than those depicted in FIG. 1. Double baffle assembly 106 may comprise any features or may be used in combination with any element depicted in, or described in reference to, FIGS. 2-8.

Double baffle assembly 106 is fixedly attached to output gear outer surface 102 using fasteners 114. Tabs 112, which extend from an outer diameter of double baffle assembly 106, are configured to receive fasteners 114. Tabs 112, when interfacing with fasteners 114, enable a flush contact between a surface of double baffle assembly 106 and output gear outer surface 102 such that lubrication remains within double baffle assembly 106 and is eventually guided into one of openings 104 in output gear outer surface 102. Each of fasteners 114 may comprise a respective threaded extension, or some other securing feature, each of which are received by a complementary feature in output gear outer surface 102 (e.g., a threaded hole). In some embodiments, each of tabs 112 comprise features configured to interface with output gear outer surface 102 (e.g., extensions with tabs which engage with protrusions in a recess formed on output gear outer surface 102) such that fasteners 114 are not required. In some embodiments, adhesive strips or adhesive material may be applied between double baffle assembly 106 and output gear outer surface 102 to secure double baffle assembly 106 to output gear outer surface 102. The adhesive may also be used in combination with tabs 112 and fasteners 114.

Double baffle assembly 106 comprises inner baffle 108A and outer baffle 108B. In some embodiments, inner baffle 108A and outer baffle 108B are connected by a continuous extension shared by each of inner baffle 108A and outer baffle 108B. In some embodiments, inner baffles 108A and outer baffle 108B are independent structures, separately affixed to output gear outer surface 102 by different sets of tabs 112 and fasteners 114 or by other means previously described. Slots 118 are formed in double baffle assembly 106 between inner baffle 108A and outer baffle 108B and are each configured to align with openings 104. For example, as output gear outer surface 102 rotates (e.g., during operation of a differential assembly), a majority of openings 104 will overlap with a majority of slots 118 to enable continuous egress of lubrication into the differential assembly while the output gear rotates or while the output gear is static (e.g., during connected and disconnected states, respectively).

Lubrication jet 110 is arranged such that the trajectory of lubrication expelled from lubrication jet 110 aligns with the space between inner baffle 108A and out baffle 108B as well as opening 104 (i.e., to maximize the amount of lubrication entering the differential assembly comprising output gear outer surface 102) when the angular orientation of the output gear rotates opening 104 such that the space of opening 104 aligns with the space of at least one of slots 118. Outer baffle 108B may comprise a lip arranged to direct lubrication towards a radially outer edge of opening 104. In some embodiments, lubrication may pool along the lip of outer baffle 108B during operation of the differential assembly in a connected state due to the rotation momentum of the output gear. When the lubrication pools, the area of one of slots 118 may be narrowed, which creates a pressure differential to force lubrication towards the internal interfaces of the differential assembly. Inner baffle 108A may also comprise a lip that is arranged to direct lubrication towards a radially inner edge of opening 104. In some embodiments, lubrication may pool along the lip of inner baffle 108A when the differential is in a disconnected state and the lip is arranged towards an upper portion of the output gear. This may also create a pressure differential to force lubrication towards the internal interfaces of the differential assembly.

Double baffle assembly 106 may also comprise connecting surface 120 between inner baffle 108A and outer baffle 108B. Connecting surface 120 may increase stiffness of double baffle assembly 106 and may enable flush contact between a back surface of double baffle assembly 106 and output gear outer surface 102.

Ribs 116 are configured to increase the stiffness of double baffle assembly 106 such that during operation of a differential assembly comprising output gear outer surface 102, double baffle assembly 106 remains in uniform contact with output gear outer surface 102 without risk of plastic or elastic deformation. Each of ribs 116 extend from a radially inner point on double baffle assembly 106 to a radially outer point that is radially inward of inner baffle 108A. Ribs 116 may also be configured to extend radially from an inner diameter center of the double baffle assembly towards an outer perimeter of the double baffle assembly. In some embodiments, a portion of ribs 116 are present on a radially outer point of outer baffle 108B while also being azimuthally aligned with a respective portion of ribs 116 that is radially inner of inner baffle 108A. Ribs 116 may also be configured to catch and guide lubrication that has escaped a space between inner baffle 108A and outer baffle 108B such that the lubrication is directed to one of slots 118. Additionally, the radially inner portion of ribs 116 may be configured to guide lubrication towards slots 118 whereas the radially outer portion of ribs 116 may be configured to guide lubrication towards a lubrication reservoir coupled with lubrication jet 110 such that the lubrication may be directed towards opening 104 via lubrication jet 110.

By incorporating double baffle assembly 106 into a differential assembly comprising output gear outer surface 102, the differential assembly may be configured with a reduced lubrication reservoir (e.g., oil sump) volume than would be required without double baffle assembly 106. For example, a differential assembly comprising an output gear without double baffle assembly 106 may require a lubrication reservoir with a 3.6 liter capacity to maintain an ideal level of lubrication throughout the interfaces of the differential assembly. When double baffle assembly 106 is affixed to output gear outer surface 102 of the exemplary differential assembly, the required lubrication reservoir capacity can be reduced to 2.6 liters (e.g., approximately a 28% reduction in the amount of lubrication accessible to the differential assembly). The reduction in volume of lubrication required to be maintained also results in a reduced height of the lubrication reservoir. For example, where a 3.6 liter reservoir may result in a 94.8 millimeter height of lubrication associated with the differential assembly, a 2.6 L reservoir may result in only a 76.1 mm height of lubrication. The incorporation of double baffle assembly 106 into a differential assembly reduces weight and size of the overall differential assembly by directly reducing the amount of standing lubrication required to ensure appropriate lubrication of internal interfaces of the differential assembly. Additionally, a lower reservoir height may reduce friction losses caused by running components through the surface of the lubrication as a lower amount of friction would affect the rotational motions of the components entering the reservoir.

Figure 2:
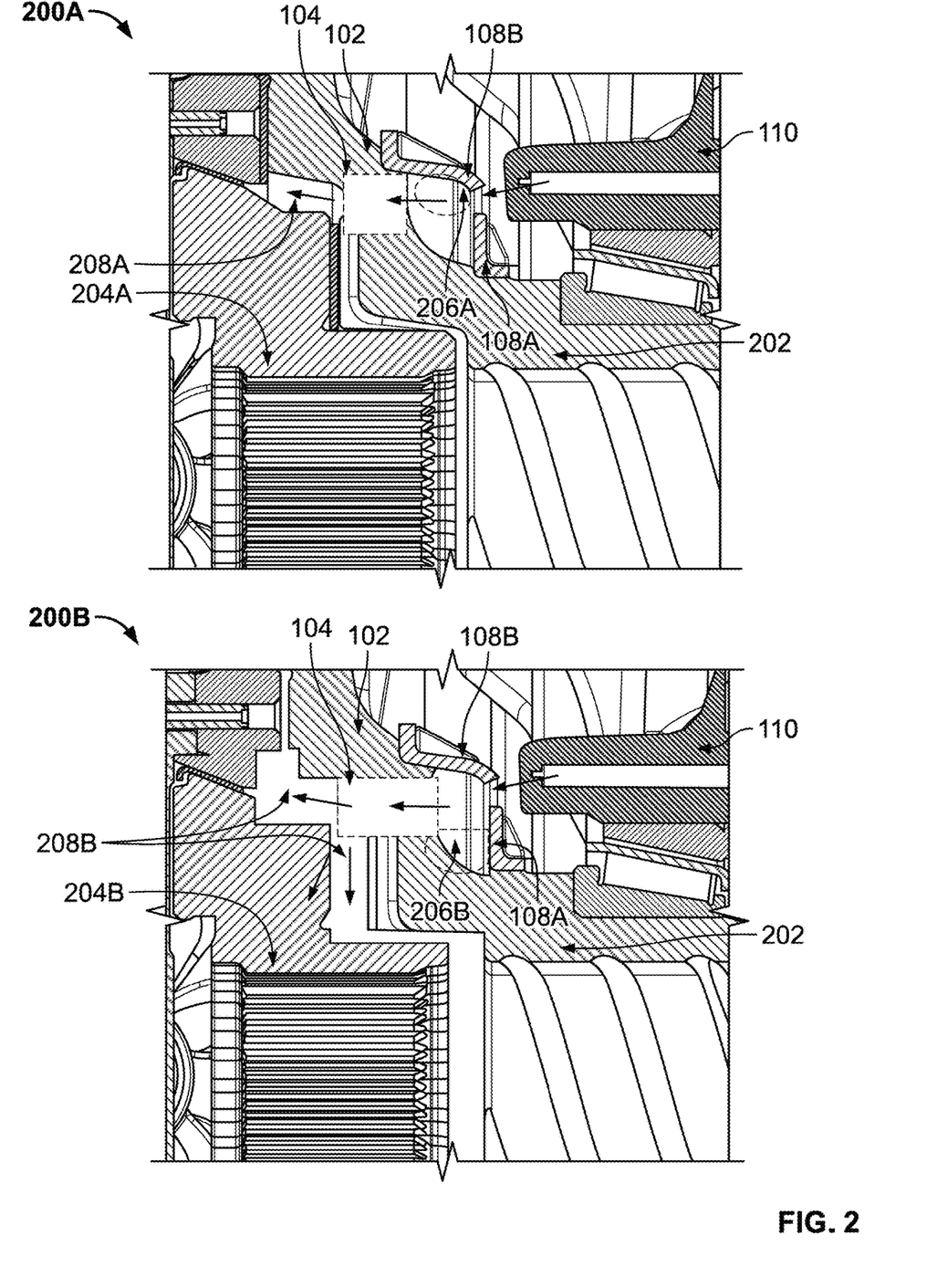
FIG. 2 depicts a pair of cross sectional views of flow paths of lubrication into a differential assembly, in both connected and disconnected states, that comprises a double baffle assembly affixed to an output gear, in accordance with some embodiments of the disclosure.

FIG. 2 includes cross sectional view 200A, which depicts side gear 204A in an engaged state with output gear 202, and cross sectional view 200B, which depicts side gear 204B in a disengaged state where side gear 204B is displaced from output gear 202, in accordance with some embodiments of the disclosure. The assemblies depicted in cross sectional view 200A and 200B may comprise fewer, or additional, features than those depicted in FIG. 2. The assemblies depicted in cross sectional view 200A and 200B may comprise any features or may be used in combination with any element depicted in, or described in reference to, FIGS. 1, and 3-8.

Cross sectional view 200A depicts a differential assembly comprising output gear 202, side gear 204A, and lubrication jet 110. Affixed to output gear outer surface 102 are inner baffle 108A and outer baffle 108B. In some embodiments, inner baffle 108A and outer baffle 108B comprise a double baffle assembly which connects portions of inner baffle 108A and outer baffle 108B. In other embodiments, inner baffle 108A and outer baffle 108B comprise separate baffle structures which when mounted, affixed, or secured to output gear outer surface 102 comprise a double baffle assembly (e.g., double baffle assembly 106 of FIG. 1). Outer baffle 108B is configured to catch oil spray deflected towards the outer diameter of output gear 202. Inner baffle 108A is configured to catch oil that deflects towards the inner diameter of output gear 202 and may comprise a feature configured to divert the collected lubrication towards opening 104.

The space between inner baffle 108A and outer baffle 108B (e.g., corresponding to slots 118 of FIG. 1) at least partially aligns with opening 104 in output gear 202. Lubrication jet 110 is aligned with opening 104 and the space between inner baffle 108A and outer baffle 108B. Lubrication jet 110 expels lubrication along trajectory 208A towards side gear 204A. As shown, side gear 204A is in an engaged state with output gear 202. Accordingly, trajectory 208A of the lubrication does not entirely penetrate the interface between side gear 204A and output gear 202 as most, if not all, of the lubrication follows trajectory 208A. Additionally, considering the contemporaneous rotation of interfacing side gear 204A and output gear 202, lubrication is not imperative for operation in this engaged state shown in cross sectional view 200A. Collected lubrication 206A corresponds to lubrication in the depicted differential assembly that has not yet passed through opening 104. Collected lubrication 206A may be dispersed through opening 104 Based on a pressure differential created between the external surface of output gear 202 and the internal surface of output gear 202. The rotation of output gear 202 creates a radially outward trajectory for lubrication expelled from lubrication jet 110 and collected between inner baffle 108A and outer baffle 108B which may result in collected lubrication 206A pooling against a lip of outer baffle 108B. The inner diameter of outer baffle 108B may be radially inward of a radially outward edge of opening 104. By having this configuration, a radial pressure gradient is created between the interior of the inner portion of output gear 202 and output gear outer surface 102. This radial pressure gradient propagates a pressurized pumping of lubrication that is expelled towards the space between inner baffle 108A and outer baffle 108B.

Cross sectional view 200B depicts a differential assembly comprising output gear 202, side gear 204B, and lubrication jet 110. Affixed to output gear outer surface 102 are inner baffle 108A and outer baffle 108B (e.g., as shown by double baffle assembly 106 of FIG. 1). The space between inner baffle 108A and outer baffle 108B aligns with opening 104 in output gear 202. Lubrication jet 110 is aligned with opening 104 and the space between inner baffle 108A and outer baffle 108B. Lubrication jet 110 expels lubrication along trajectory 208B towards side gear 204B. As shown, side gear 204B is in a disengaged state with output gear 202. In the shown disengaged or disconnected state of the differential assembly, lubrication pools as collected lubrication 206B which enables a higher rate of lubrication to be directed towards opening 104 as output gear 202 remains stationary because of the pressure differential created by narrowing opening 104. Accordingly, trajectory 208B of the lubrication as depicted enables lubrication to enter the gap between side gear 204B and output gear 202, allowing lubrication to be dispersed between interfacing surfaces of side gear 204B and output gear 202. The ability of inner baffle 108A and outer baffle 108B to collect lubrication as shown in FIG. 2 eliminates the need for the jet to be targeted at opening 104 when the differential assembly is in the disengaged state where side gear 204B and output gear 202 are not interfacing.

Figure 3:
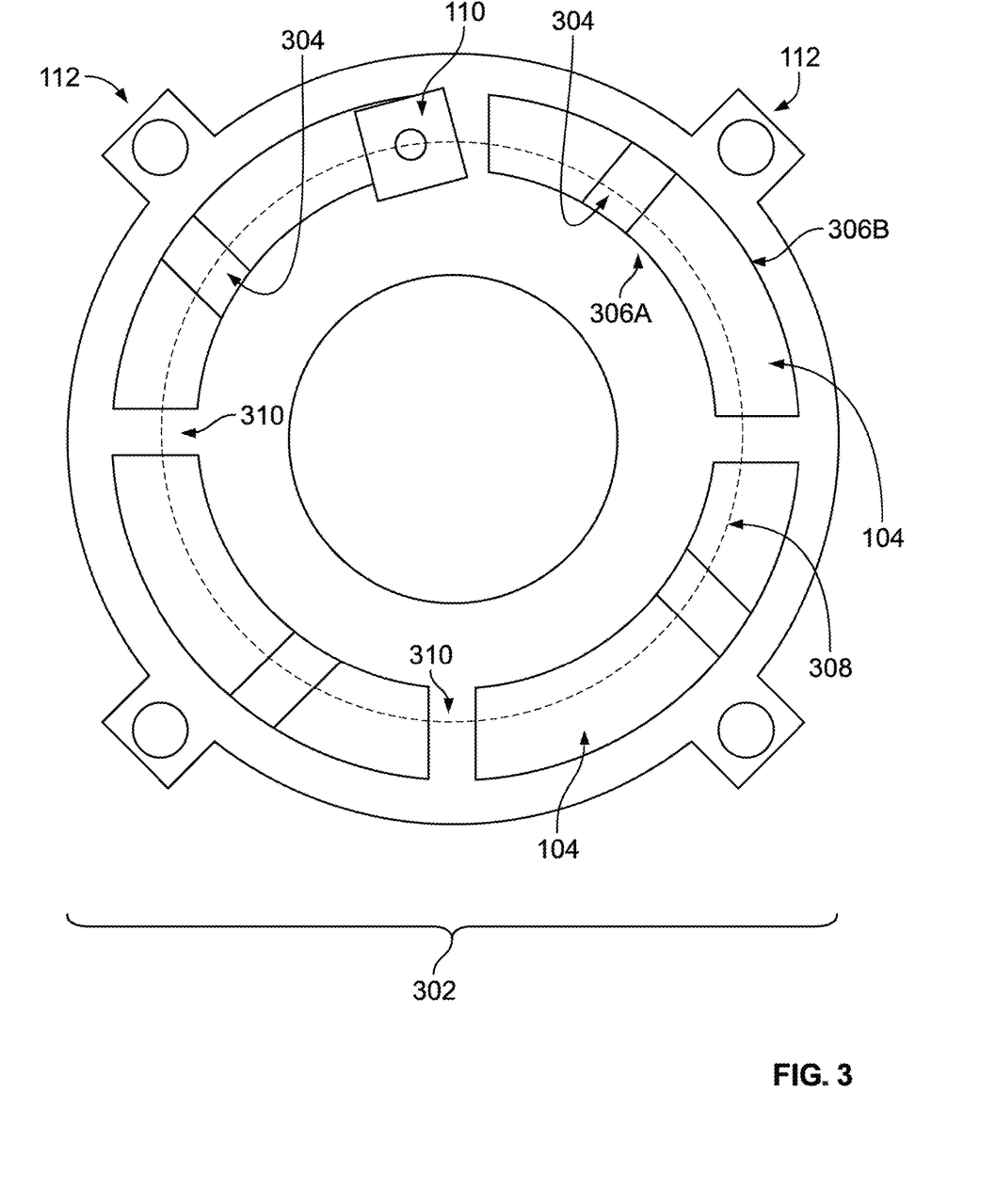
FIG. 3 depicts an alignment of openings in an output gear and a slot formed by a double baffle assembly affixed to the output gear, in accordance with some embodiments of the disclosure.

FIG. 3 depicts double baffle assembly 302 with slots formed by connecting extensions 310 and aligning with openings 104 formed by output gear features 304 to the extent that multiples of connecting extensions 310 create multiple slots, in accordance with some embodiments of the disclosure. Double baffle assembly 302 may comprise fewer, or additional, features than those depicted in FIG. 3. Double baffle assembly 302 may comprise any features or may be used in combination with any element depicted in, or described in reference to, FIGS. 1, 2, and 4-8.

Double baffle assembly 302 comprises tabs 112, inner baffle 306A, outer baffle 306B, and connecting extensions 310. Each of inner baffles 306A and outer baffle 306B correspond to inner baffle 108A and outer baffle 108B of FIGS. 1 and 2. In some embodiments, connecting extensions 310 comprise material continuous with each of inner baffle 306A and outer baffle 306B. Openings 104 corresponding to opening 104 of FIGS. 1 and 2 in an output gear outer surface. Openings 104 are bordered by output gear features 304, which may comprise material of the output gear or other components/interfaces that are internal to a differential assembly comprising the output gear to which double baffle assembly 302 is affixed to (e.g., using fasteners received by tabs 112). Output gear features 304 are configured to enabling passage of lubrication through the output gear without compromising the structural integrity of the output gear. Lubrication jet 110 is arranged such that the lubrication expelled aligns with target lubrication diameter 308. Each of lubrication jet 110 and openings 104 are arranged such that most of the lubrication expelled from lubrication get 110 will initially pass through double baffle assembly 302 substantially aligned with target lubrication diameter 308. Target lubrication diameter 308 may be defined by a radially central diameter of openings 104 and/or a target lubrication pool volume corresponding to a target pressure differential between the outer surface of the output gear or differential housing (e.g., to achieve a target lubrication rate based on the pressure differential described in reference to FIG. 2) to which double baffle assembly 302 is affixed and the inner surface of the output gear corresponding to a depth of each of openings 104.

Figure 4:
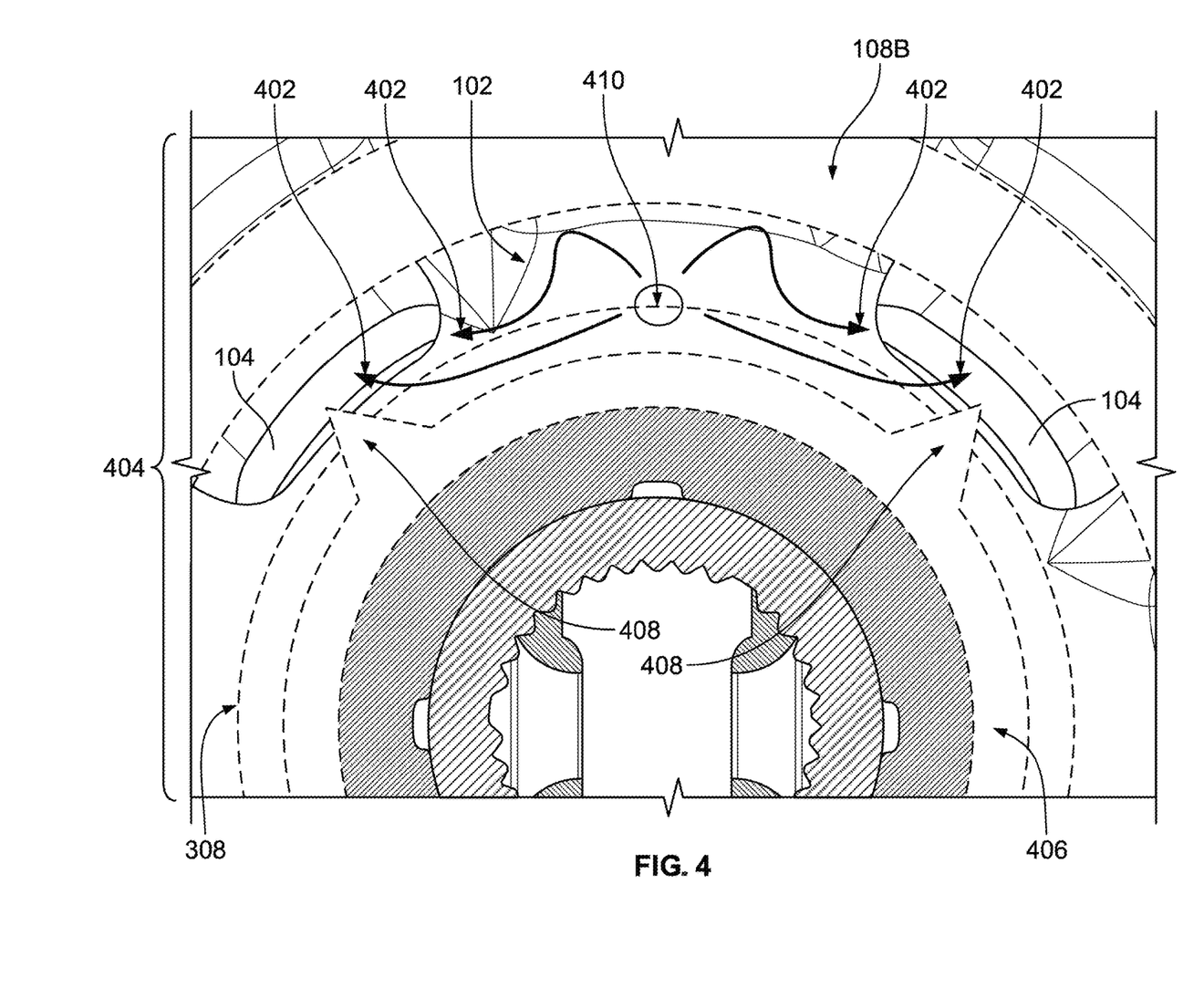
FIG. 4 depicts illustrative flow paths of lubrication introduced to an exemplary double baffle assembly, in accordance with some embodiments of the disclosure.

FIG. 4 depicts flow paths 402 of lubrication expelled towards double baffle assembly 404, in accordance with some embodiments of the disclosure. Double baffle assembly 404 may comprise fewer, or additional, features than those depicted in FIG. 4. Double baffle assembly 404 may comprise any features or may be used in combination with any element depicted in, or described in reference to FIGS. 1-3 and 5-8.

Double baffle assembly 404 comprises inner baffle 406 and outer baffle 108B, corresponding to outer baffle 108B of FIG. 1. Inner baffle 406 comprises protrusions 408 which are structured to guide and/or direct lubrication or oil that has not gone through openings 104 after being expelled from a lubrication jet (e.g., lubrication jet 110 of FIG. 1) toward lubrication target 410. Openings 104 correspond to the openings in the output gear of FIG. 1. Lubrication target 410 is radially aligned with target lubrication diameter 308 of FIG. 3. Lubrication target 410 may be radially aligned with each of openings 104 and not directed at one of openings 104 because lubrication emitted towards lubrication target 410 will be directed towards outer baffle 108B. Accordingly, to ensure most of the emitted lubrication enters openings 104, lubrication target 410 may be arranged radially inwards of an inner diameter of each of openings 104. Once the lubrication impacts output gear outer surface 102, the lubrication will generally flow towards each of openings via flow paths 402.

Each of flow paths 402 are formed by each of outer baffle 108B and inner baffle 406. For example, if the lubrication is emitted towards lubrication target 410 when none of openings 104 are aligned with lubrication target 410 (e.g., as depicted in FIG. 4), each of outer baffle 108B and inner baffle 406 collect and divert oil towards at least one of openings 104. This is most likely to occur when a differential assembly comprising the output gear to which double baffle assembly 404 is mounted is in a disconnected state (e.g., as shown in FIG. 2). Outer baffle 108B is configured to catch lubrication that deflects towards the outer diameter of double baffle assembly 404. Inner baffle 406 is configured to catch lubrication that deflects towards the inner diameter of double baffle assembly 404 and directs the lubrication into openings 104 via protrusions 408. This eliminates a need to align a lubrication jet such that lubrication target 410 is always aligned with one of openings 104, thereby enabling a continuous flow of lubrication which prevents wear and increases the lifetime performance of the differential assembly. Once the differential assembly changes to an engaged state where the output gear is rotating (e.g., as shown in FIG. 2), protrusions 408 act as guiding features to direct any pooled lubrication towards openings 104 as the space between inner baffle 406 and outer baffle 108B align with openings 104.

Figure 5:
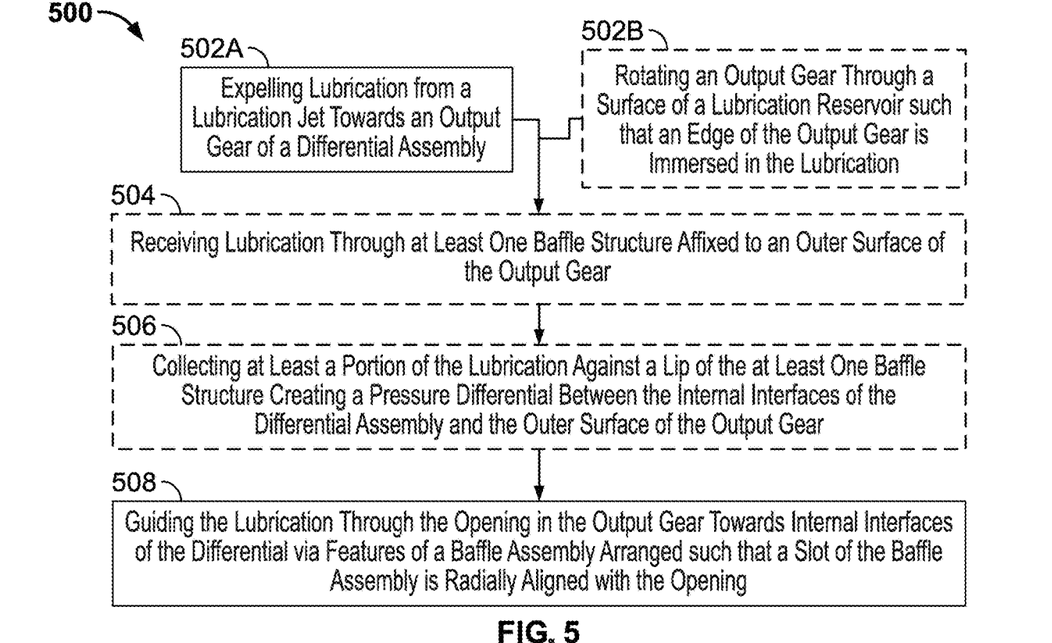
FIG. 5 is a flowchart of an illustrative method of lubricating a differential assembly using a baffle assembly, in accordance with some embodiments of the disclosure.

FIG. 5 depicts lubrication method 500 for lubricating a differential assembly using a baffle assembly, in accordance with some embodiments of the disclosure. Lubrication method 500 may be executed using fewer, or additional, features than those depicted in FIGS. 1-4 and 6-8. Lubrication method 500 may be executed by any means enabled by any features, whether alone or used in combination, or any element depicted in, or described in reference to, FIGS. 1-4 and 6-8.

At 502A, lubrication is expelled from a lubrication jet towards an output gear of a differential assembly. In some embodiments, at 502B, the output gear is rotated through a surface of a lubrication reservoir such that an edge of the output gear (e.g., a section of the outer diameter of the output gear radially proximate to the opening) is at least partially immersed in the lubrication. In some embodiments, both steps 502A and 502B are performed substantially contemporaneously and/or are connected to whether the differential assembly is in a connected or disconnected state. At 504, lubrication is received through at least one baffle structure (e.g., double baffle assembly 106 of FIG. 1) that is affixed to an outer surface of the output gear or differential housing. At 506, at least a portion of the lubrication is collected against a lip of the at least one baffle structure, which creates a pressure differential between the internal interfaces of the differential assembly and the outer surface of the output gear or differential housing. At 508, the lubrication is guided through the opening in the output gear towards the internal interfaces of the differential assembly via features of the baffle assembly (e.g., protrusions 408 of FIG. 4), wherein a slot of the baffle assembly is arranged such that baffle assembly is radially aligned with the opening.

Figure 6:
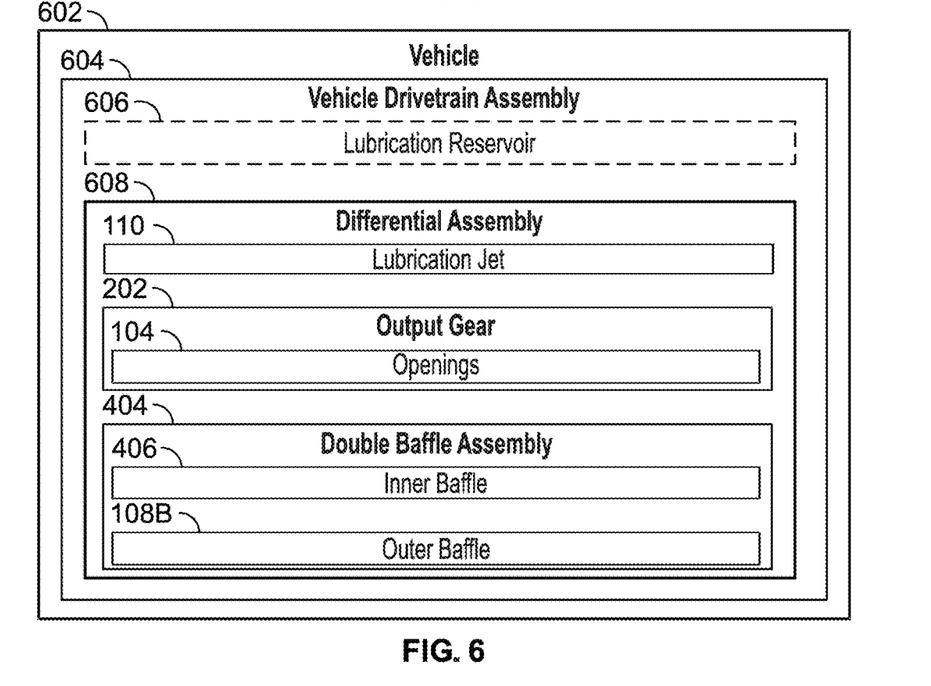
FIG. 6 is a block diagram of an illustrative vehicle comprising a differential assembly with a double baffle assembly, in accordance with some embodiments of the disclosure.

FIG. 6 depicts vehicle assembly 602, in accordance with some embodiments of the disclosure. Vehicle assembly 602 may comprise fewer, or additional, features than those depicted in FIG. 6. Vehicle assembly 602 may comprise any features or may be used in combination with any element depicted in, or described in reference to, FIGS. 1-5, 7, and 8.

Vehicle 602 comprises vehicle drivetrain assembly 604. Vehicle 602 may correspond to any electrically power or combustion engine vehicle configured for transportation. Vehicle drivetrain assembly 604 in some embodiments comprises lubrication reservoir 606. Lubrication reservoir 606 may be directly connected to either of drivetrain assembly 604 or specifically to differential assembly 608, depending on the rate of lubrication required by each of the components of drive train assembly 604. Differential assembly 608 comprises lubrication jet 110 of FIG. 1, output gear 202 of FIG. 2, and double baffle assembly 404 of FIG. 4. Output gear 202 comprises openings 104 of FIG. 1, which are radially aligned to receive lubrication emitted from lubrication jet 110. Openings 104 may change azimuthal alignment with lubrication jet 110 based on the rotation or engaged/disengaged status of output gear 202. Double baffle assembly 404 comprises inner baffle 406 of FIG. 4 and outer baffle 108B of FIG. 1. Double baffle assembly is configured to execute lubrication method 500 of FIG. 5 by guiding lubrication emitted from lubrication jet 110 into openings 104.

Figure 7:
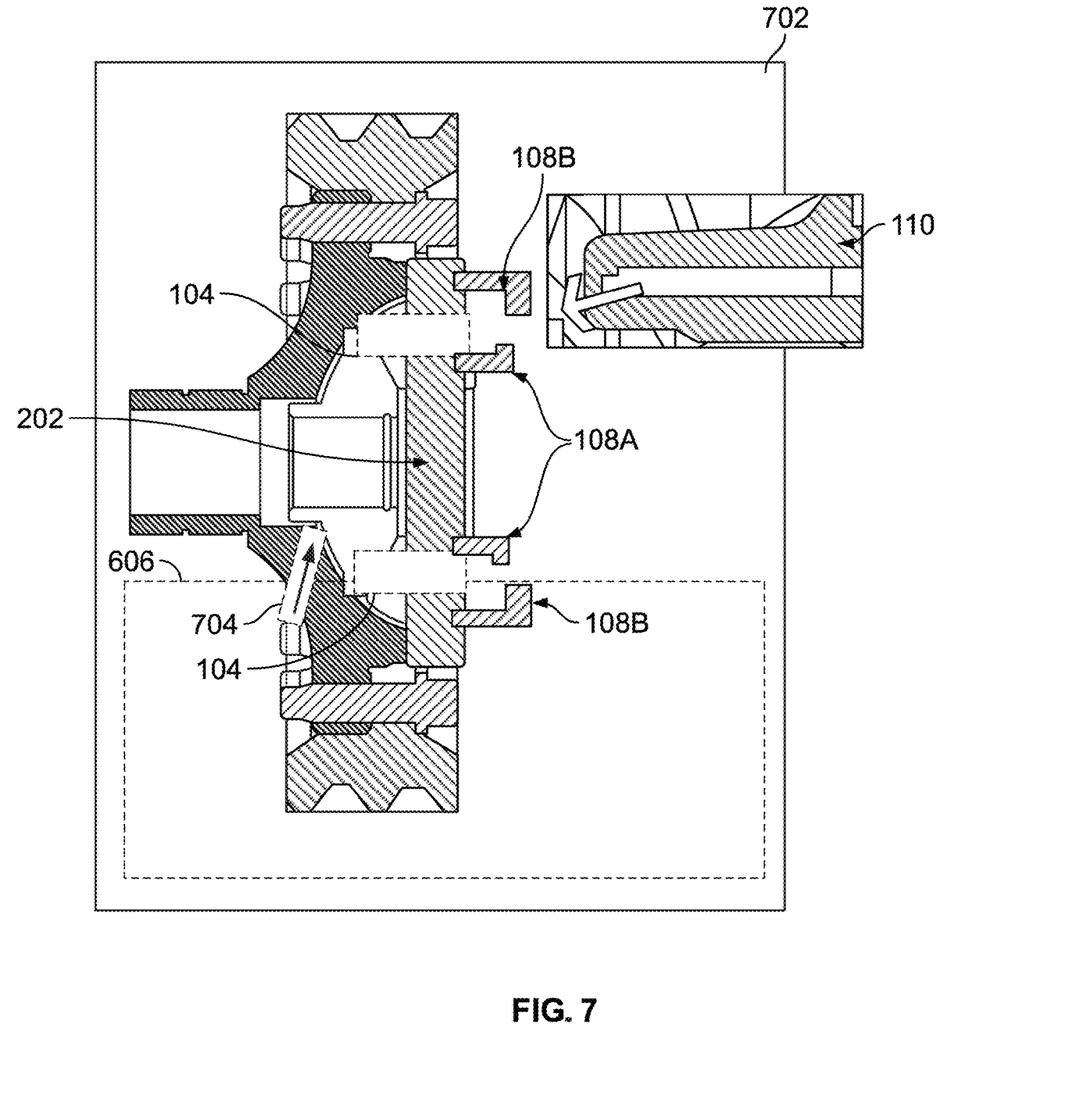
FIG. 7 is a cross sectional view of an exemplary differential, comprising a double baffle assembly, interfacing with a lubrication reservoir, in accordance with some embodiments of the disclosure.

FIG. 7 depicts a cross sectional view of differential assembly 702, in accordance with some embodiments of the disclosure. Differential assembly 702 may comprise fewer, or additional, features than those depicted in FIG. 7. Differential assembly 702 may comprise any features or may be used in combination with any element depicted in, or described in reference to, FIGS. 1-6 and 8.

Differential assembly 702 comprises output gear 202. Openings 104 comprise through holes in an outer surface of output gear 202. Lubrication jet 110 is arranged to expel lubrication towards a radial position substantially aligned with each of openings 104 as output gear 202 rotates. Affixed to the outer surface of output gear 202 are inner baffle 108A and outer baffle 108B. In some embodiments, inner baffle 108A and outer baffle 108B are separate assemblies. In some embodiments, inner baffle 108A and outer baffle 108B are elements of a single double baffle assembly (e.g., double baffle assembly 106 of FIG. 1). The edge of output gear 202 may be positioned such that they rotate through a surface of lubrication reservoir 606 of FIG. 6. Openings 104 and at least outer baffle 108B may be positioned along a diameter of output gear 202 such that as output gear 202 rotates, one or both of openings 104 and at least outer baffle 108B are drawn through and below the surface of lubrication reservoir 606. As shown in FIG. 7, each of outer baffles 108B and inner baffles 108A comprise respective lips configured to pool lubrication when differential assembly is in a connected or disconnected state. Additionally, inner baffles 108A may be shorter than outer baffles 108B to ensure splash back deflected from outer baffles 108B are directed inwards towards inner baffles 108A and openings 104. Lubrication channel 704 may also be provided, which may introduce lubricant from lubrication reservoir 606 into the housing of differential assembly 702 to increase the rate of lubrication distribution throughout differential assembly 702.

Figure 8:
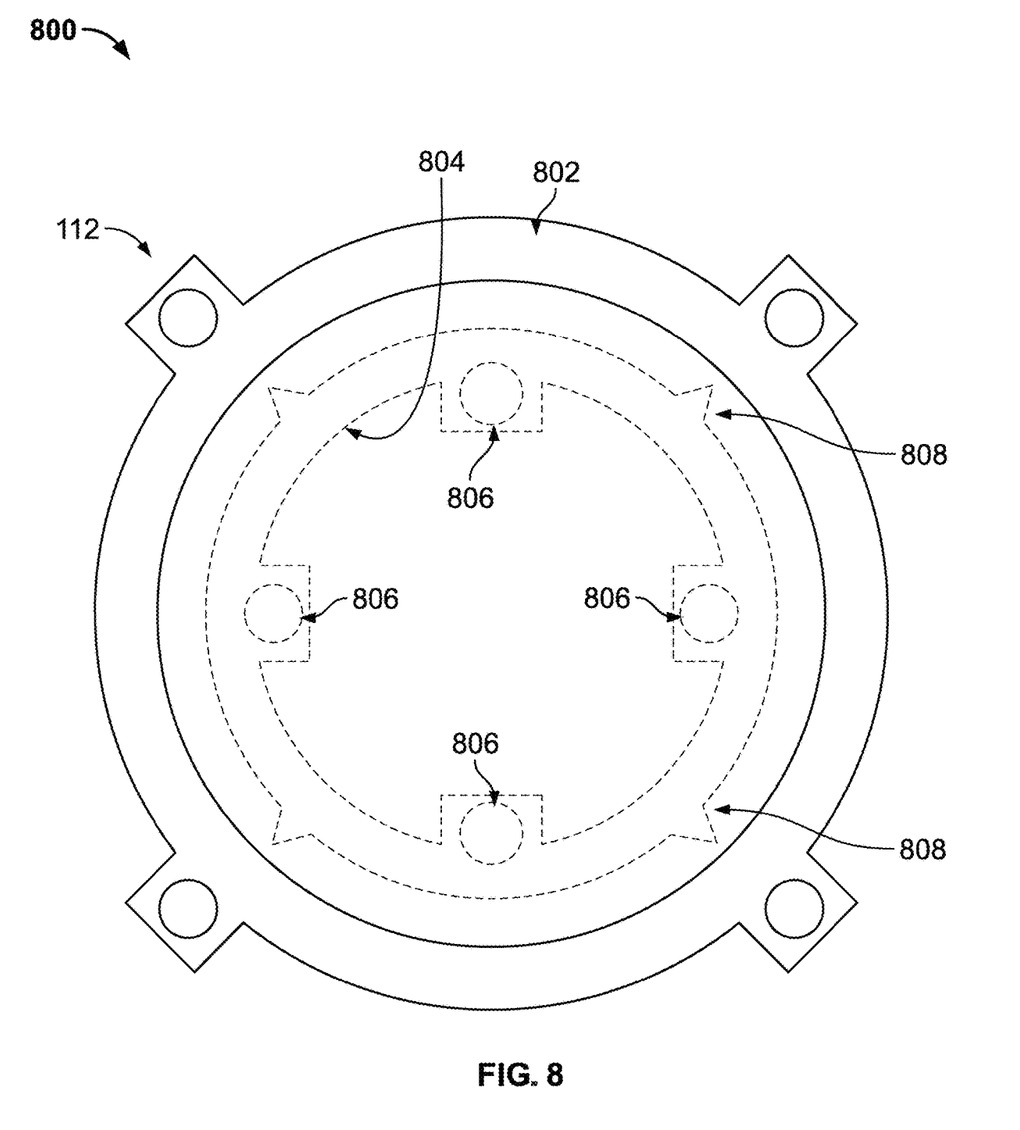
FIG. 8 depicts an exemplary double baffle assembly comprising a pair of independent baffles, in accordance with some embodiments of the disclosure.

FIG. 8 depicts double baffle assembly 800 comprising outer baffle 802 and inner baffle 804, in accordance with some embodiments of the disclosure. Double baffle assembly 800 may comprise fewer, or additional, features than those depicted in FIG. 8. Double baffle assembly 800 may comprise any features or may be used in combination with any element depicted in, or described in reference to, FIGS. 1-7.

Outer baffle 802 comprises tabs 112 of FIG. 1, configured to receive a fastener or other securing feature to create flush contact between outer baffle 802 and an outer surface of an output gear or differential housing. The inner diameter of outer baffle 802 may be arranged substantially aligned with an outer diameter of an opening in the outer surface of the output gear or differential housing to which outer baffle 802 is affixed. Arranged towards an inner diameter of outer baffle 802 is inner baffle 804. Inner baffle 804 comprises protrusions 808 which are configured to guide lubrication emitted from a lubrication jet towards at least one opening in the output gear. The outer diameter of inner baffle 804 may be arranged substantially aligned (e.g., sharing an edge) with the inner diameter of the opening in the output gear to which inner baffle 804 is affixed. In some embodiments, the outer diameter of inner baffle 804 is aligned radially displaced with the inner diameter of the opening in the output gear and protrusions 808 are arranged to guide and/or direct lubrication into the openings. Inner baffle 804 further comprises securing tabs 806, which are configured to receive a fastener or other feature configured to secure inner baffle 804 to an outer surface of the output gear or differential housing such that inner baffle 804 remains substantially flush with the outer surface of the output gear or differential housing. As shown in FIG. 8, double baffle assembly 800 does not comprise a connecting portion between inner baffle 804 and outer baffle 802.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to examples, any such reference is merely to provide context to the instant disclosure and does not form any admission as to what constitutes the state of the art.

What is claimed is:
1. An output gear comprising:
   an opening in an outer surface; and
   a double baffle assembly affixed to the outer surface, wherein the double baffle assembly comprises:
      an inner baffle arranged radially inward of the opening; and
      an outer baffle arranged radially outward of the opening, wherein the inner baffle and outer baffle are configured to guide fluid to the opening.

2. The output gear of claim 1, wherein the inner baffle comprises a protrusion configured to direct lubrication towards the opening.

3. The output gear of claim 1, wherein the double baffle assembly comprises a connecting extension between the inner baffle and the outer baffle.

4. The output gear of claim 1, wherein the double baffle assembly comprises a plurality of slots radially aligned with the opening.

5. The output gear of claim 1, wherein the double baffle assembly is fixedly attached to the outer surface of the output gear or differential housing by fasteners.

6. The output gear of claim 1, wherein the double baffle assembly is fixedly attached to the outer surface of the output gear or differential housing by at least one of an adhesive and a feature configured to be received by the outer surface of the output gear or differential housing.

7. The output gear of claim 1, wherein the double baffle assembly comprises a plurality of spaced ribs that extend radially from an inner diameter of the double baffle assembly towards an outer diameter of the double baffle assembly.

8. The output gear of claim 1, wherein the double baffle assembly comprises a plurality of tabs configured to receive fasteners to affix the double baffle assembly to the outer surface of the output gear or differential housing.

9. An assembly comprising:
   an output gear having an inner surface and an outer surface and an opening therebetween;
   a differential arranged to interface with the inner surface of the output gear; and
   a baffle assembly affixed to the outer surface, wherein the baffle assembly comprises a slot radially aligned with the opening.

10. The assembly of claim 9, wherein the baffle assembly further comprises:
    a radially inner baffle configured to direct lubrication towards a center of the opening via a protrusion; and
    a radially outer baffle arranged to direct lubrication towards a radially outer edge of the opening.

11. The assembly of claim 9, wherein the baffle assembly comprises a connecting surface between the inner baffle and the outer baffle aligned with a trajectory of a lubrication jet.

12. The assembly of claim 9, further comprising a lubrication jet arranged to spray lubrication towards the opening.

13. The assembly of claim 9, wherein the baffle assembly comprise:
    a radially inner baffle affixed to the outer surface of the output gear or differential housing and arranged along a radially inner edge of the opening; and
    a radially outer baffle affixed to the outer surface of the output gear or differential housing and arranged along a radially outer edge of the opening.

14. The assembly of claim 9, wherein the baffle assembly comprises a plurality of slots radially aligned with the opening.

15. The assembly of claim 9, wherein the baffle assembly is fixedly attached to the outer surface of the output gear or differential housing by fasteners.

16. The assembly of claim 9, wherein the baffle assembly is fixedly attached to the outer surface of the output gear or differential housing by at least one of an adhesive and a feature configured to be received by the outer surface of the output gear or differential housing.

17. The assembly of claim 9, wherein the baffle assembly comprises a plurality of evenly spaced ribs that extend radially from a center of the baffle assembly towards an outer perimeter.

18. The assembly of claim 9, wherein the baffle assembly comprises a plurality of tabs configured to received fasteners to affix the baffle assembly to the outer surface of the output gear or differential housing.

19. The assembly of claim 9, wherein the output gear is configured to change between a connected and disconnected state while maintaining alignment of the slot and the opening for continuous lubrication of the differential.

20. A method of lubricating a differential comprising:
    expelling lubrication from a lubrication jet towards an output gear of the differential assembly; and
    guiding the lubrication towards an opening in the output gear via a first baffle extension and a second baffle extension arranged towards a radially inner edge of the opening and a radially outer edge of the opening, respectively.

* * * * *